United States Patent [19]

Parker

[11] Patent Number: 4,963,630
[45] Date of Patent: Oct. 16, 1990

[54] COPOLYMER OF RESIN ACIDS AND MALEIC ANHYDRIDE

[75] Inventor: David W. Parker, Holland, Pa.

[73] Assignee: Union Camp Corporation, Wayne, N.J.

[21] Appl. No.: 336,947

[22] Filed: Apr. 12, 1989

Related U.S. Application Data

[63] Continuation-in-part of Ser. No. 243,579, Sep. 13, 1988, abandoned, which is a continuation-in-part of Ser. No. 191,935, May 9, 1988, abandoned.

[51] Int. Cl.$^5$ .......................................... C08F 210/04
[52] U.S. Cl. .................................. 526/238.3; 530/214
[58] Field of Search ....................... 526/238.3; 530/214

[56] References Cited

U.S. PATENT DOCUMENTS

| | | | |
|---|---|---|---|
| 2,072,818 | 1/1935 | Humphrey | 260/101 |
| 3,582,509 | 6/1971 | Staniak et al. | 260/101 |
| 3,692,720 | 9/1972 | Sloan | 260/101 |
| 4,056,498 | 11/1977 | Laurito | 260/101 |
| 4,260,550 | 4/1981 | Armstrong et al. | 260/101 |
| 4,574,057 | 3/1986 | Kaza et al. | 260/101 |
| 4,751,025 | 6/1988 | Olechowski et al. | 260/101 |

FOREIGN PATENT DOCUMENTS

| | | | |
|---|---|---|---|
| 204581 | 12/1954 | Australia | 260/101 |
| 519999 | 12/1955 | Canada | 260/101 |
| 590061 | 1/1960 | Canada | 260/101 |
| 690880 | 7/1964 | Canada | 260/101 |
| 151822 | 12/1966 | U.S.S.R. | 260/101 |

*Primary Examiner*—John Kight, III
*Assistant Examiner*—Dennis R. Daley
*Attorney, Agent, or Firm*—Edward J. Sites

[57] ABSTRACT

Copolymerization of maleic anhydride with the resin acids present in rosin, especially abietic-type resin acids (e.g., abietic acid and neoabietic acid), to form high molecular weight copolymers is disclosed. The polymerization is carried out in the presence of a free radical initiator such as AIBN. The temperature can range up to about 190° C. and a solvent such as THF can also be present.

21 Claims, No Drawings

COPOLYMER OF RESIN ACIDS AND MALEIC ANHYDRIDE

This application is a continuation in part of copending application Ser. No. 243,579 filed Sept. 13, 1988, now abandoned, which in turn is a continuation in part of copending application Ser. No. 191,935 filed May 9, 1988 now abandoned.

BACKGROUND OF THE INVENTION

This invention relates to polymers derived from rosin and, more specifically, to the copolymer which forms between maleic anhydride and resin acids present in rosin under the influence of a free radical initiator.

It is known that rosin can be reacted at elevated temperatures, for example, 200° C., with maleic anhydride. The high temperatures promote Diels-Alder and Ene reactions between maleic anhydride and certain of the resin acids present in rosin. Because these reaction products, which are called "rosin maleic anhydride adducts," result from the simple adduction of one molecule of maleic anhydride and one molecule of reactable rosin component, they are of low molecular weight, specifically, 400 g/mole. This adduction chemistry has been described in detail by researchers at the United State Gypsum Company in Smith et al., "Products of the Reaction Between Rosins and Maleic Anhydride":, *J. Paint Tech.*, May 1969.

Rosin and rosin maleic anhydride adducts have been found to be unsuitable for many commercial applications in which materials with much higher molecular weights find utility. In order to overcome the low melting point and lack of film-forming ability inherent with the rosin and rosin maleic anhydride adducts, researchers have for many years tried to produce high molecular weight materials (>400 g/mole) from rosin. A high molecular weight polymer formed from rosin would have a higher melting point and better film-forming properties than rosin or rosin adducts alone and would thus, if formulated into an ink or coating, impart increased hardness and thermal and UV stability.

The so called "polymerization" of rosin has previously been reported to occur when rosin is treated with Lewis acids or strong Bronsted acids, such as sulfuric acid, as disclosed in U.S. Pat. No. 2,107,366 issued to Morton. However, it is well known that the vast majority of the "polymer" which results from strong acid treatment of rosin consists of rosin dimer having a molecular weight of about 604 g/mole. The structure of one such dimer, formed by treatment of methyl levopimarate with p-toluenesulfonic acid, has been described by Gigante et al., *J. Chem. Soc. Chem. Comm.*, 13:1038-9 (1986). Similar rosin "polymers" have been reported to form upon heating rosin or rosin derivatives in the presence of a substance known to decompose under the heating conditions to form free radicals. But as disclosed by Breslow in U.S. Pat. No. 2,554,487 and U.S. Pat. No. 2,554,810, the "polymers" formed under these free-radical conditions are "chiefly dimeric". No references have been found which describe the preparation of materials consisting solely of rosin which have molecular weights above that of the dimer.

The copolymerization of rosin with a reactive comonomer has heretofore proved as elusive as the homopolymerization of rosin. In U.S. Pat. No. 2,580,876, Arvin and Gitchel disclose that rosin may be reacted with styrene at high temperatures, with or without a free-radical initiator, to form "interpolymers". These "interpolymers" are ill-defined, and the extent to which rosin has actually copolymerized with styrene is not established. U.S. Pat. No. 2,311,781 to Scrutchfield discloses a composition described as a rosin-formaldehyde-maleic anhydride "conjoint condensate".

Another direction pursued by researchers desiring to make a high molecular weight rosin-containing polymer has been to modify and/or derivatize rosin in ways that make resin acid components of rosin more amenable to a polymerization process. The derivatization of rosin frequently involved forming a reactive ester of rosin. An example of this general approach can be seen in the disclosures of Ropp in U.S. Pat. No. 2,727,872 and U.S. Pat. No. 2,727,873. Ropp prepared vinyl esters of "stabilized" (hydrogenated and/or dehydrogenated)-rosin and copolymerized them with reactable vinyl compounds, including vinyl chloride and vinyl stearate, in the presence of a free-radical initiator. Another noteworthy example is U.S. Pat. No. 2,639,273 in which Gould discloses that the allyl ester of stabilized rosin, but not natural rosin, may be copolymerized with styrene or maleic anhydride in the presence of a free-radical initiator. Other examples of this general approach, including U.S. Pat. No. 3,401,154, are well known in the art but cannot be considered polymerizations of rosin as the resin acid groups themselves are not participating in the polymerization, rather they are merely pendant groups. Furthermore, the conversion of rosin to a reactive ester is an expensive, low-yield process.

Still another approach toward the goal of preparing high molecular weight rosin-containing polymers consists of reacting rosin with a preexisting polymer. As disclosed in U.S. Pat. No. 2,479,516 by Rust and Canfield, poly (allyl acetate) and rosin may be combined and heated to a temperature of 250° C. with concomitant collection of acetic acid. These same authors, in U.S. Pat. No. 2,447,367, disclose that the ethylene glycol monoester of rosin can be transesterified with the preformed polymer formed by the homopolymerization of ethyl acrylate. Other examples of this general approach, including U.S. Pat. No. 3,997,487 are well known.

Copolymers obtained by the polymerization of the reaction product of rosin acid partial esters of a polyol with a polymerizable vinyl monomer, such as styrene or maleic anhydride, are disclosed in U.S. Pat. No. 3,401,154 issued to MacArthur.

A composition produced by condensing a monoalkanolamine with the reaction product of a terpene and, for example, an acid anhydride, is disclosed in U.S. Pat. No. 3,043,789 to Cyba. The terpene component may be a rosin.

Despite an apparent wealth of literature relating to the polymerization and copolymerization of rosin, the inventor is not aware of any prior art which describes the production of high molecular weight copolymers formed soley between unmodified resin acids and maleic anhydride.

SUMMARY OF THE INVENTION

This invention is directed to the product of the copolymerization of resin acids present in rosin, or esters thereof, with maleic anhydride, said polymer having a weight average molecular weight greater than 1200. These copolymers exhibit properties that enable their use in various applications. This invention also relates to terpolymers comprised mainly of resin acids and maleic anhydride and to methods for preparing the polymers of this invention.

DETAILED DESCRIPTION OF THE INVENTION

The material of commerce known as rosin is a natural substance commonly obtained from pine trees. It comprises largely structurally similar C-20 monocarboxylic acids which are known as, and are referred to hereinafter as, resin acids. Rosin also frequently contains fatty acids, decarboxylated resin acids, and resin acid dimers and anhydrides. The composition of rosin will vary depending on the species of tree from which it is isolated, the location and season of the isolation, and the manner of isolation. Gum rosin is the sap collected when a pine trunk is tapped, and tall oil rosin is a by-product of the paper making process. Examples of the rosins which may be utilized to prepare the polymers of this invention include tall oil rosin, distilled tall oil rosin, gum rosin and wood rosin. A more complete description of the various resin acid components of rosin can be found in a report written by M. S. Bhatnagar in *Paint India* February 1982, pp. 4–19.

The structures of three of the resin acids typically present in rosin, referred to hereinafter as the "abietics", are as follows:

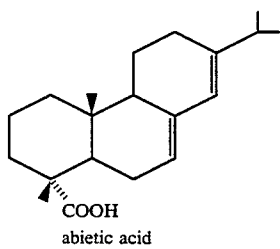
abietic acid

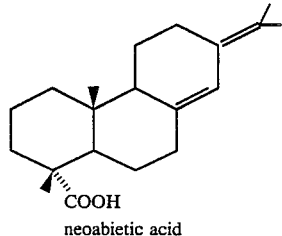
neoabietic acid

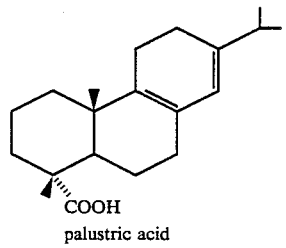
palustric acid

In preparing the copolymers of this invention, rosin, maleic anhydride, and an effective amount of at least one free-radical polymerization initiator are combined, preferably in the presence of a suitable solvent. After mild heating for an appropriate length of time, the product mixture consists of untreated rosin, rosin dimer, rosin maleic anhydride adducts, and a substantial amount of copolymer formed between rosin and maleic anhydride and having a weight average molecular weight of greater than 1200. Analysis of the residual unreacted rosin in the product mixture indicates that "abietics", the resin acids identified above, are no longer present. Although not intending to be bound by this theory, it is the inventor's belief that abietic acid and neoabietic acid undergo copolymerization with maleic anhydride, while the palustric acid reacts with maleic anhydride primarily to produce a 1:1 Diels-Alder adduct.

The copolymer is believed to be a 1:1 resin acid:maleic anhydride polymer and to have the form of a linear polymer wherein the maleic anhydride and resin acid units repeat in an alternating arrangement, part of which can be represented as follows:

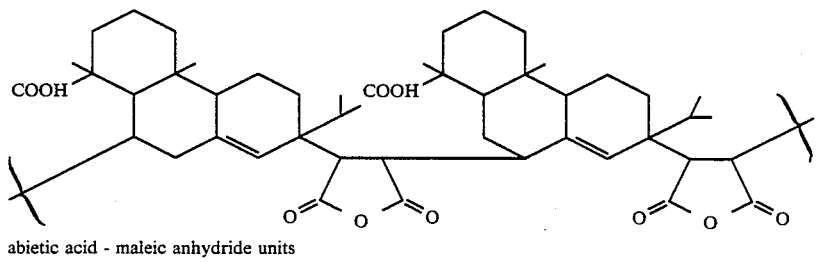
abietic acid - maleic anhydride units

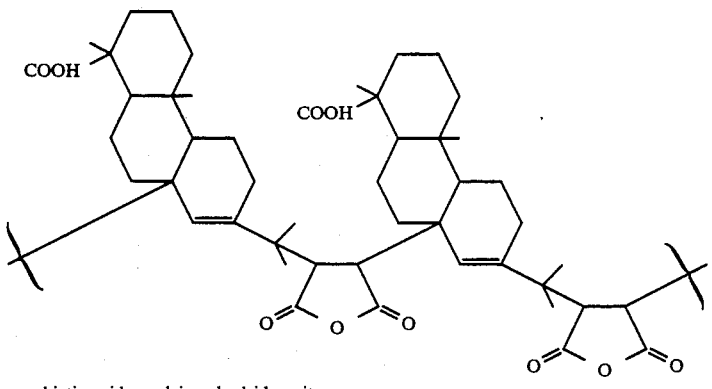

neoabietic acid - maleic anhydride units

In preparing the copolymers of this invention, the rosin may be used without prior modification. In other words, the resin acid is not stabilized, i.e., aromatized or hydrogenated, to control or prevent its reaction in the polymerization process, and it is not activated, i.e., esterified with a reactive unsaturated alcohol, or adducted prior to copolymerization. In fact, since the olefinic bonds present in the abietics are believed crucial to the success of the copolymerization reaction, prior stabilization of rosin through aromatization or hydrogenation is judged detrimental. One can prepare copolymers of maleic anhydride and modified rosin if the modification does not disrupt the olefinic composition of the rosin. For example, unreactive esters and/or anhydrides of rosin can be partially or completely substituted for rosin in the practice of this invention.

In general, the ratio of monomers utilized is not critical; however, it is convenient to employ a molar ratio of maleic anhydride to abietics of between 1.0 and 2.0, preferably between 1.0 and 1.5.

The polymers of this invention can further comprise one or more additional monomers capable of polymerizing with maleic anhydride. Such additional monomers preferably comprise not more than 50 mole % of the polymer, and the resulting polymers preferably comprise at least about 25 mole % resin acid(s) and at least about 25 mole % maleic anhydride. Monomers capable of polymerizing with maleic anhydride are well known in the art and include, for example, styrene, acrylic acid and acrylic esters, and certain terpenes such as beta-pinene, beta-phellandrene and isoterpinolene.

The copolymers of this invention are prepared by contacting maleic anhydride and rosin in the presence of an effective amount of one or more free-radical initiators. The preferred initiator is 2,2'-azobis(2-methylpropanenitrile) (AIBN). Other suitable initiators include peroxides, e.g. benzoyl peroxide, cyclohexanone dialkyl peroxides and dicumyl peroxide. Ordinarily, initiator concentration will be within the range of from about 0.01 to 2 weight percent, preferably about 0.1 to 1 weight percent, based on the total weight of rosin and maleic anhydride.

The temperature employed can be varied over a wide range. The most suitable temperature is largely fixed by the choice of the free-radical initiator. A reaction temperature such that the half-life of the initiator is approximately one hour is convenient, but higher or lower temperatures are acceptable. Ordinarily, the temperature will be between room temperature and 190° C., preferably between 40° C. and 130° C., and more preferably between 60° to 80° C.

It is preferable to conduct the copolymerization in a solvent. A suitable solvent should dissolve the starting materials at the reaction temperature employed and also dissolve the product mixture. Preferred solvents include aromatic hydrocarbons such as toluene, aliphatic or aromatic esters such as ethyl acetate, and aliphatic ethers such as tetrahydrofuran.

As previously indicated, the product mixture obtained ordinarily consists of the copolymer formed between selected resin acids and maleic anhydride, unreacted resin acids and other inert rosin components, and adducts formed between maleic anhydride and selected resin acids. The properties of this product mixture depend upon the composition of the mixture, which in turn depends upon the source of the rosin and the reaction conditions employed. Product mixtures with ring-and-ball softening points above 115° C. are easily obtained. The pure copolymer can be obtained by means known in the art (e.g., by distillation of the other components, or more easily, by precipitation of a toluene solution of the product mixture in methanol) and has a melting point range of 270°–285° C.

Copolymers with a weight average molecular weight of at least about 1200, preferably in the range of about 3,000 to 10,000 as measured by gel permeation chromatography with retention times referenced to polystyrene of known molecular weights, using a refractive index detector, may be most easily prepared according to this invention.

The invention will now be described in connection with the following examples wherein part and percentages are by weight and temperatures are in degrees centigrade. The rosin used in examples 1–13 is a tall oil rosin and contains 27% abietic acid, 25.5% dehydroabietic acid, 7.3% palustric acid, 4.5% isopimaric acid, 2.3% neoabietic acid, 12% other resin acids, and 18.4% of dimers and other non-gc thoughput. This rosin has an acid number of 166, a ring and ball softening point of 76° C., and is available commercially from Union Camp Corporation as Unitol NCY.

EXAMPLE 1

A flask was charged with 75.5 g Unitol NCY, 16.2 g maleic anhydride and 64.0 g toluene. This mixture was heated to 70° C. while the rosin and maleic anhydride dissolved. With stirring 0.75 g AIBN was added at once, and the solution was maintained at 70° C. for 8 hours. The toluene and unreacted maleic anhydride were then distilled by gradual application of a 3 mm Hg vacuum and a temperature of 159° C. This resulted in 80.9 g of product which, according to liquid chromatography (calibrated refractive index detector), contained 23% copolymer with a weight average molecular weight of 6,000 (relative to polystyrene). The remaining 77% consisted of unreacted rosin and rosin maleic anhydride adduct. This product mixture has a ring and ball softening point of 115° C., and a saponification number of 262.

EXAMPLES 2-4

To determine the extent to which the maleic anhydride to rosin ratio affects the copolymerization, three reactions were run as described in Example 1, with the following variation. Each starting material mixture consisted of 75 g Unitol NCY rosin, 75 g toluene, and 0.75 g AIBN. The maleic anhydride loading was varied, however, with loadings of 12 g, 16 g, and 20 g in the three reactions. A reaction temperature of 70° C. was used, and the reactions were monitored periodically by pulling samples and examining those samples by liquid chromatography. The results of this analysis are presented in Table 1. The rate of copolymer formation and the amount of copolymer formed after 28 hours (shown in Table 1) was higher at the higher maleic anhydride (MA) loading.

TABLE 1

| Example | Amount MA | Amount Copolymer |
|---|---|---|
| 2 | 12 g | 23.2% |
| 3 | 16 g | 27.6% |
| 4 | 20 g | 30.5% |

EXAMPLES 5-7

To determine the influence of temperature, three reactions were run as described in Example 1, with the following variation. The starting material mixture in each case consisted of 75 g Unitol NCY rosin, 16 g maleic anhydride, 0.75 g AIBN, and 75 g toluene. The reaction temperature was varied, however, with temperatures of 60° C., 70° C., and 80° C. being used. The results of this study are presented in Table 2. After 10 hours, a higher temperature resulted in a higher copolymer yield. However, after 20 hours of reaction, the reaction run at 70° C. yielded more copolymer than the reaction run at 80° C.

TABLE 2

| Example No. | Temp. | 10 hr. Yield of Copolymer | 24 hr. Yield of Copolymer |
|---|---|---|---|
| 5 | 80° C. | 27.1% | 27.7% |
| 6 | 70° C. | 25.4% | 30.7% |
| 7 | 60° C. | 14.9% | 24.9% |

EXAMPLES 8-10

To determine the effect of initiator loading on the copolymerization, three reactions were run as described in Example 1, with the following variation. The starting material mixture in each case consisted of 75 g Unitol NCY rosin, 16 g maleic anhydride, and 75 g toluene. A constant reaction temperature of 70° C. was maintained, but the AIBN loading was varied, with loadings of 0.375 g, 0.750 g, and 1.125 g being employed. The results of this study are presented in Table 3. It is apparent that the amount of copolymer formed after 24 hours was greater when a higher loading of free radical initiator was used.

TABLE 3

| Example No. | Amount of AIBN | Copolymer Yield |
|---|---|---|
| 8 | 0.375 g | 25.1% |
| 9 | 0.750 g | 29.8% |
| 10 | 1.125 g | 33.5% |

EXAMPLES 11-13

To determine the effect of dilution on the copolymerization, three reactions were run as described in Example 1, with the following variation. Each reaction was run at 70° C., and with starting material mixtures of 75 g Unitol NCY rosin, 16 g maleic anhydride, and 0.75 g AIBN. The amount of toluene solvent was varied, however, with solvent masses of 50 g, 75 g and 100 g being employed. The results of this study are presented in Table 4. It can be seen that dilution has a relatively small effect on the copolymerization, but that a larger amount of copolymer was formed after 24 hours when 50 g rather that 100 g of toluene were used.

TABLE 4

| Example No. | Amount of Solvent | Amount of Copolymer |
|---|---|---|
| 11 | 100 g | 27.4% |
| 12 | 75 g | 29.3% |
| 13 | 50 g | 30.1% |

EXAMPLE 14

The apparatus described in Example 1 was assembled, and the flask charged with 36.38 g NCY rosin, 16.47 g maleic anhydride, and 64.36 g toluene. The mixture was heated to 80° C. and stirred to homogeneity. To the reactants 0.49 g AIBN was then added at once, and 34.26 g isoterpinolene of 95% purity was added through an additional funnel over a period of about one hour. This mixture was heated with stirring for twenty-one hours. An additional 0.50 g AIBN was added every seven hours, and, after fourteen hours, an additional 7.5 g maleic anhydride was added. The solvent and unreacted maleic anhydride and terpene were then removed by vacuum distillation. The product had a sap number of 288, Gardner color (40% in THF) of 10+, and a ring and ball softening point of 153° C. By liquid chromatography, the product was 60% by weight polymer, and that polymer had a weight average molecular weight of 6,900.

Following the teachings disclosed herein, it can be seen that high molecular weight copolymers can be prepared from rosin and maleic anhydride. These copolymers retain reactivity through the presence of carboxylic acid, anhydride and olefinic functionality. These sites of reactivity allow for ready modification of the polymer, e.g., alcohols may be added to the anhydride functionality to prepare mono (half) or di (full) esters. Other obvious modifications include esterification of the carboxylic acid group, cross-linking through the points of unsaturation, and amidization or imidization of the anhydride groups using amine containing reactants. This reaction is particularly useful, as primary amines such as ethanolamine react readily with the anhydride groups in the copolymer at low temperatures to give a polymer having good water solubility above pH 7.0. Techniques to accomplish these transformations are well known.

The following uses are among those in which the polymers, product mixtures, and the derivatives thereof may be applied: adhesives, tackifiers, ink resins and components of coating compositions. Methods of employing polymers in the aforementioned uses are well known to those skilled in the art and are disclosed in the literature.

What is claimed is:

1. A polymer comprising the product of a copolymerization of monomers consisting essentially of maleic anhydride reactive resin acids present in rosin, or esters thereof, and maleic anhydride, said process being carried out in the presence of an effective amount of at least one free radical initiator, said polymer having a weight average molecular weight of at least about 1200.

2. The polymer of claim 1 which is the product of the 1:1 copolymerization of resin acids present in rosin, or esters thereof, and maleic anhydride.

3. The polymer of claim 1 wherein the resin acids comprise abietics.

4. The polymer of claim 3 wherein the resin acids comprise abietics selected from abietic acid and neoabietic acid.

5. The polymer of claim 2 having a weight average molecular weight of at least about 3000.

6. The copolymer of claim 3 having a weight average molecular weight of at least about 3000.

7. The copolymer of claim 4 having a weight average molecular weight of at least about 3000.

8. The polymer of claim 1 comprising repeating units selected from units of the formula

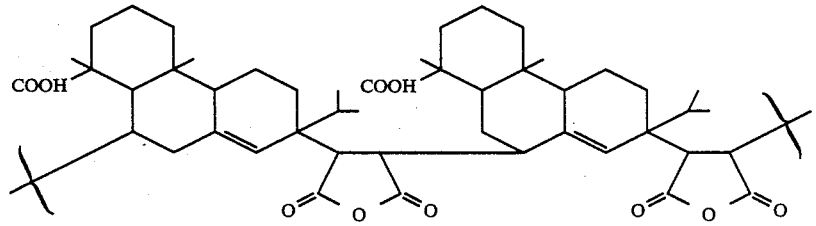

and

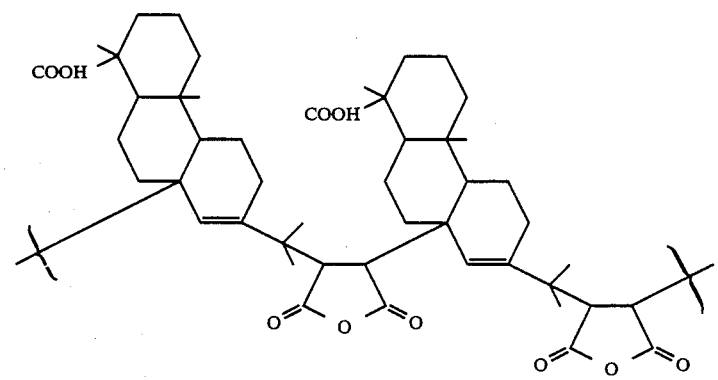

9. The polymer of claim 8 having a weight average molecular weight of at least about 3000.

10. A process for preparing a copolymer of resin acids and maleic anhydride having a weight average molecular weight of at least about 1200 comprising copolymerizing approximately equimolar amounts of monomers consisting essentially of maleic anhydride and one or more resin acids, or esters thereof, in the presence of an effective amount of at least one free-radical initiator.

11. The process of claim 10 wherein at least about 0.01 weight percent, based on total weight of rosin and maleic anhydride, of said free radical polymerization initiator is present.

12. The process of claim 11 wherein about 0.1 to 2 weight percent, based on total weight of rosin and maleic anhydride, of said free radical polymerization initiator is present.

13. The process of claim 10 wherein the free radical polymerization initiator is 2,2'-azobis(2-methylpropanenitrile).

14. The process of claim 10 wherein the rosin and maleic anhydride are contacted in the presence of a solvent.

15. The process of claim 14 wherein the solvent is selected from the group consisting of toluene, ethyl acetate and tetrahydrofuran.

16. The process of claim 10 wherein the rosin, maleic anhydride and free radical polymerization initiator are contacted at a temperature in the range of about 40° to 130° C.

17. The process of claim 10 where said rosin and said maleic anhydride are contacted in amounts such that the molar ratio of maleic anhydride to abietics is in the range of about 1.0 to 2.0.

18. The process of claim 17 where said molar ratio is in the range about 1.0 to 1.5.

19. The process of claim 10 where said rosin is selected from the group consisting of tall oil rosin, gum rosin, distilled tall oil rosin and wood rosin.

20. The process of claim 10 where the product of said copolymerization is purified by removing unreacted rosin.

21. The process of claim 10 where said rosin and maleic anhydride are contacted in amounts such that the molar ratio of maleic anhydride to abietics in the range of about 1.0 to 1.5; are contacted in the presence of 0.01 to 2 weight %, based on total weight rosin and maleic anhydride, of a free radical polymerization initiator; and are contacted in the presence of a solvent.

* * * * *